INVENTOR:
Jiří ŠIMURDA
BY
Arthur O. Klein
ATTORNEY

United States Patent Office 3,544,897
Patented Dec. 1, 1970

3,544,897
PULSE-MODULATED PUSH-PULL AMPLIFIER
STAGE FOR A DUAL-COIL METER
Jiří Simurda, Brno, Czechoslovakia, assignor to Vyzkumny
ustav Zdravotnicke techcniky, Brno, Czechoslovakia
Filed Jan. 29, 1969, Ser. No. 794,954
Claims priority, application Czechoslovakia,
June 21, 1967, 4,544/67
Int. Cl. G01r 19/26, 15/10
U.S. Cl. 324—120                    4 Claims

ABSTRACT OF THE DISCLOSURE

A pulse modulated push-pull amplifier for individually feeding the coils of a dual-coil meter is arranged to incorporate the respective coils in a pair of common modulation-demodulation circuits. The stage modulates a slowly varying incoming signal to form a pair of pulse trains that are (a) generated with the same repetition period; (b) mutually displaced by one half cycle of the repetition period; and (c) modulated in pulse duration in complementary fashion in proportion to the amplitude of the incoming signal. The modulated pulse trains are applied across the respective coils of the meter, and the resulting current through the coils are rectified to form push-pull replicas of the incoming signal.

BACKGROUND OF THE INVENTION

One kind of electromagnetic meter suitable for use in diagnostic instruments such as electro-cardiographs includes a rotatable armature coupled to a pair of magnetically interacting, orthogonally disposed coils for movement through an angle proportional to the differential excitation of the coils. The meter may include an amplifier stage which is connected in push-pull for applying, to the coils, complementary replicas of a relatively slowly varying signal which is coupled to the input of the stage and whose amplitude is to be indicated on the meter. To minimize power dissipation in such an arrangement, the push-pull stage may be pulse-modulated to convert the input signal to a pair of pulse trains occurring at a relatively rapid rate and modulated in mutually complementary ways in proportion to the variations in the input signal. The pulse trains may then be demodulated and applied to the respective coils of the meter.

Present designs of this type are somewhat cumbersome and costly in that they require the respective coils to be disposed in separate demodulator stages, individually coupled to the push-pull outputs of the modulator through one or more pulse amplifiers.

SUMMARY OF THE INVENTION

In accordance with the invention, a pulse modulated push-pull stage of the above-mentioned type for feeding a dual-coil meter is provided with a pair of common modulator-demodulator circuits that include the respective coils, thereby dispensing with the necessity of amplifying a pair of modulated pulse trains between the output of the modulator and the coils prior to demodulation.

In an illustrative embodiment, the modulator of the stage includes a pair of normally disabled detectors that have different threshold levels and are triggerable by positive-going and negative-going signals, respectively, that exceed the associated threshold level. The input signal is added, at the input of each detector, to an auxiliary repetitive signal which exhibits generally symmetrical positive-going and negative-going triangular portions during successive half-cycles. The respective detectors are rendered operative during alternate half-cycles of the resulting composite signal for as long as the associated triangular portion exceeds the threshold to form duration-modulated complementary pulse trains.

A pair of normally disabled DC energizing paths that include the respective meter coils are coupled to the outputs of the detectors. The energizing paths are enabled during the operating interval of the associated detectors to apply corresponding duration-modulated pulses of DC voltage across the coils. A pair of diodes are connected in shunt with the respective coils for rectifying the resulting energizing current therethrough to form the required push-pull replicas of the input signal.

BRIEF DESCRIPTION OF THE DRAWING

The nature of the invention will appear more fully from the following detailed description of an illustrative embodiment taken in conjunction with the appended drawing in which.

DETAILED DESCRIPTION

Figure 1:
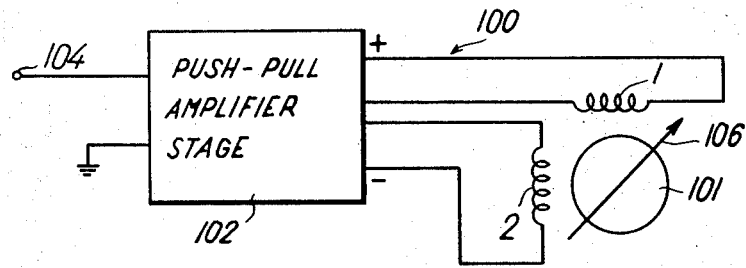
FIG. 1 is a pictorial representation of a dual-coil meter fed by a push-pull amplifier stage.

Referring in more detail to the drawing, FIG. 1 shows schematically a conventional electromagnetically responsive meter 100 having a pair of orthogonally disposed, mutually coupled coils 1 and 2. A rotatable armature 101 is suitably mounted in the resultant magnetic field of the coils 1 and 2 for rotation, in the plane of the drawing, through an angle proportional to the differential average excitation current in the coils 1 and 2.

Figure 3:
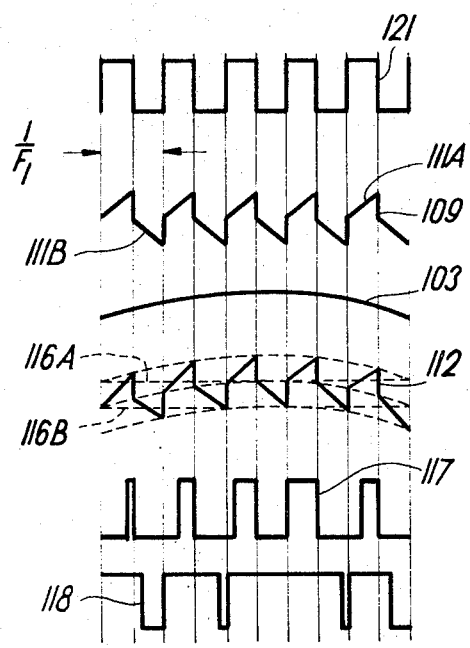
FIG. 3 is a set of waveform diagrams applicable to different portions of the push-pull stage of FIG. 2.

The coils 1 and 2 are excited in push-pull relation from an amplifier stage 102, whose outputs are a pair of complementary replicas of a relatively slowly varying measurement signal, designated by the numeral 103 in FIG. 3 that is applied to an input terminal 104 (FIG. 1) of the stage 102. When equal average excitation currents are applied to the coils 1 and 2 from the stage 102, a pointer 106 carried by the armature 101 stabilizes in a reference zero position that may be indicated on a suitable scale (not shown) of the meter 100. Any deviation of the average currents through the coils 1 and 2 from the equal reference value (which deviation will be in opposite directions in the two coils because of the push-pull configuration of the stage 102) will cause the armature 101 and pointer 105 to move to a new position whose deviation from the reference position will be proportional to the deviation of the average current in each coil from its reference value.

Figure 2:
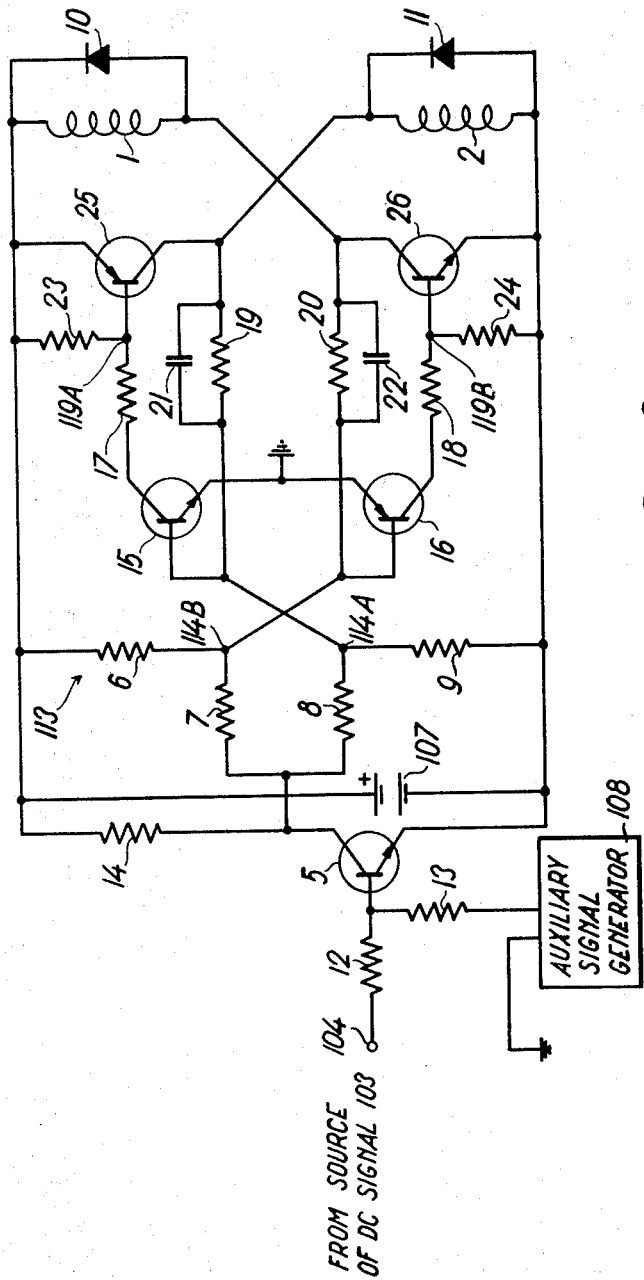
FIG. 2 is a schematic diagram of a pulse-modulated push-pull stage suitable for use in the arrangement of FIG. 1 and having common modulator-demodulator circuits that include the meter coils in accordance with the invention.

In accordance with the invention, the push-pull source 102 may take the form shown in FIG. 2. The input signal 103 is coupled via a resistor 12 to the base of a first NPN transistor 5 whose emitter-collector path is normally forward-biased by a DC source 107 through a resistor 14. The input signal 103 is added, at the base of the transistor 5, to the output of an auxiliary signal generator 108 having a repetitive AC waveform which is designated by the numeral 109 in FIG. 3. The signal 109 is coupled to the base of the transistor 5 through a resistor 13. The signal 109 has a repetition rate $F_1$ that is large with respect to the highest frequency component of the slowly varying input signal 103. The auxiliary signal 109 exhibits on successive half-cycles thereof, generally symmetrical positive-going and negative-going triangular portions 111A and 111B. The output signal of the transistor 5, depicted as solid curve 112 in FIG. 3, is proportional to the sum of the input signal 103 and the AC auxiliary signal 109.

The output signal 112 appearing on the collector of the transistor 5 is coupled to the base of NPN transistor 15 through a resistor 8 and to the base of a PNP transistor 16 through a resistor 7. The transistors 15 and 16 are connected in common-emitter configuration.

The resistors 7 and 8 are serially connected to the DC source 107 through an additional pair of resistors 6 and 9 to form a voltage divider 113. The divider 103 is employed to normally bias the transistors 15 and 16 to their nonconductive states. In particular, a relatively negative junction 114A between the resistors 8 and 9 is coupled to the base of the NPN transistors 15 to bias its base-emitter path to cut off, while a relatively positive junction 114B between the resistors 6 and 7 is applied to the base of the transistor 16 to bias its base-emitter path to cut off. The collector-emitter paths of the transistors 15 and 16 are serially connected to the DC source 107 through resistors 23, 17, 18 and 24.

With this arrangement, the transistors 15 and 16 act as normally disabled threshold detectors which are selectively rendered conductive during successive half cycles of the composite signal 112 at the output of the transistor 5. For example, the NPN transistor 15, whose bias may be represented by a dotted straight line 116A in FIG. 3, will be rendered conductive during the portion of each positive-going half cycle of the control signal 112 whose amplitude exceeds the threshold 116A in the positive direction. Similarly, the NPN transistor 16, whose bias may be represented by a dotted straight line 116B, will be rendered conductive during the portion of each negative-going half cycle of the control signal 112 whose amplitude exceeds the threshold 116B in the negative direction. As a result, the width of the conductive interval of the NPN transistor during successive positive half cycles will be directly modulated in proportion to the amplitude variation of the input DC signal 103. The width of the conductive interval of the NPN transistor 16 during successive negative half cycles will be modulated in a manner complementary to the modulation of the conductive interval of the NPN transistor 15. The resulting push-pull collector outputs of the transistors 15 and 16 are a pair of pulse trains of negative and positive polarity, respectively, that are (a) generated with identical repetition periods 1/F1; (b) displaced in time by 1/2F; and (c) modulated in complementary fashion in proportion to the DC signal 103 applied to the input terminal 104.

In order to prevent modulation distortion of the pulse trains at the outputs of the transistors 15 and 16, the resistors 6–9 of the voltage divider 113 may be chosen such that (1) the bias of the transistor 15, represented by the threshold level 116A, is just sufficient to keep the transistor 15 nonconductive during the occurrence of that positive-going peak of the control signal 112 corresponding to the lowest value of the input signal 103; and (2) the bias of the transistor 16, represented by the threshold level 113B, is just sufficient to keep the transistor 16 nonconductive during the occurence of that negative-going peak of the control signal 112 corresponding to the highest value of the input signal 103. The desired relation of the bias levels 116A and 116B to the control signal 112 is clearly shown in FIG. 3.

The pulse train at the collector of the NPN transistor 15 is coupled to the base of a NPN transistor 25 through a resistor 17. The pulse train at the collector of the transistor 16 is coupled to the base of NPN transistor 26. The transistor 25 is normally held cut off by a relatively positive potential applied to its base from a junction 119A of the resistors 17 and 23. The transistor 26 is normally held cut off by a relatively negative potential applied to its base from a junction 119B of the resistors 18 and 24.

The collector-emitter paths of the normally disabled transistors 25 and 26 are individually serially connected with the respective coils 2 and 1 of the meter 100 (FIG. 1) across the DC source 107 (FIG. 2) to define normally disabled first and second DC energizing paths for the respective coils. A pair of rectifying diodes 10 and 11 respectively shunt the coils 1 and 2 and are poled to be normally reverse-biased by the DC source 107.

By suitable choice of the resistors 17, 23, 18 and 24, the transistors 25 and 26 may be respectively driven into their conductive states during the occurrence of the successive pulses of the associated oppositely poled pulse trains applied thereto from the transistors 15 and 16. Such enabling of the transistors 25 and 26 in synchronism with the occurrence of pulses in the associated input trains cause corresponding duration-modulated positive pulses of DC voltage from the DC source 107 to be applied across the associated coils 2 and 1. The resulting trains of positive voltage pulses are identified by the numerals 117 and 118, respectively, in FIG. 3.

Each successive DC voltage pulse of the train 117 applied across coil 2 causes an exponential build-up of excitation current in that coil for the duration of the pulse. Upon the termination of each pulse, the transistor 25 reverts to its nonconductive state to disable the DC energizing path for the coil 2. Coils 2 and 15 thereupon instantaneously reversed in polarity to switch its normally nonconductive shunting diode 11 to its conductive state, thereby providing a low impedance path for dissipation of the stored energy of the coil 2. This permits the coil current to exponentially decay from its peak value during the interval between the termination of each pulse in the train 117 and the start of the next succeeding pulse. Because of the presence of the rectifying diode 11, the average DC current through the coil 2 will be proportional to the duration of the corresponding pulse of the train 117. Since the pulses in that train are duration-modulated in proportion to the amplitude of the input signal 103, the variations in average current through the coil 2 will be replica of the corresponding variations in the input signal 103.

In like manner, it will be understood by analogy that the average current in the coil 1 due to the excitation thereof by the successive pulses in the train 118 will be a replica of the complement of the input signal 103.

Since the respective average currents through the coils 1 and 2 define push-pull counterparts of the signal 103, the corresponding movement of the armature 101 and pointer 106 (FIG. 1) of the meter 100 will be driven through an angle proportional to the amplitude of the DC signal 103.

It will be noted from the above that the circuit described in FIG. 2 incorporates each of the coils 1 and 2 as part of a common modulating-demodulating circuit. Specifically, the demodulating portions of the stage, i.e., the coils 1 and 2 and the shunting diodes 10 and 11, are directly coupled to the inputs of the modulating portions (i.e., the transistors 15, 16, 25, and 26 and associated circuitry) without the necessity of intervening pulse amplifiers.

To provide added stability for the arrangements of FIG. 2, a negative feedback path including a resistor 19 and a shunting capacitor 21 extends from the collector of the transistor 25 to the base of the transistor 15. Similarly, a negative feedback path including a resistor 20 shunted by a capacitor 22 extends from the collector of the transistor 26 to the base of the transistor 16.

Figure 4:
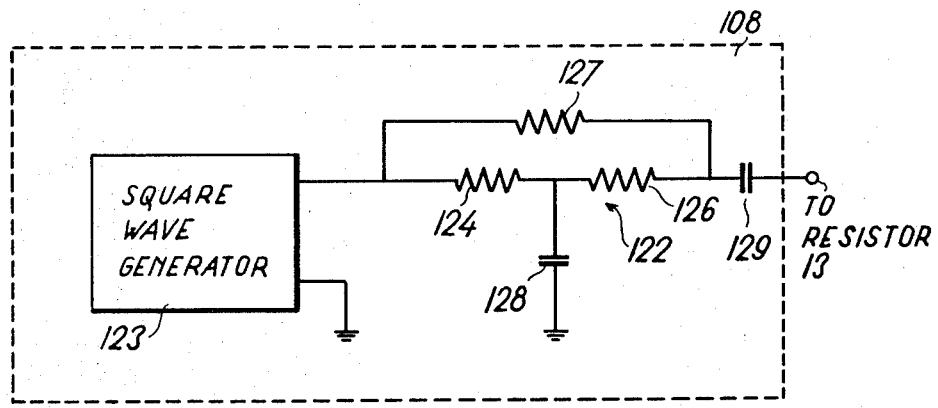
FIG. 4 is a schematic diagram of one embodiment of an auxiliary signal generator suitable for use in the arrangement of FIG. 2.

One illustrative embodiment of the auxiliary signal generator 108 is shown in FIG. 4. A square wave of repetition period 1/F1, whose waveform is depicted as 121 in FIG. 3, is applied to the input of a ladder circuit 122 from a suitable square wave generator 123. The circuit 122 includes (1) a series branch having a pair of serially connected resistors 124 and 126 that are bridged by a resistor 127, and (2) a shunt branch including a capacitor 128 coupled from the junction of the resistors 124 and 126 to ground. The output waveform of the ladder circuit, which constitutes the auxiliary signal 109 shown in FIG. 3, is applied to the resistor 13 at the base of the transistor 5 (FIG. 2) through a capacitor 129 (FIG. 4).

What is claimed is:

1. In a dual-coil electromagnetic instrument, a pulse-modulated amplifier stage for applying, to the respective coils, push-pull replicas of a relatively slowly varying input measurement signal, which comprises:

means for generating, at a first rate higher than the highest frequency component of the input signal, a cyclically repetitive auxiliary signal exhibiting generally symmetrical positive-going and negative-going triangular portions during successive half cycles thereof;

means for adding the auxiliary signal and the input signal to generate a composite control signal;

first and second normally unoperated detectors having different threshold levels and rendered operative by positive-going and negative-going signals, respectively, that exceed the associated threshold;

means for applying the control signal to the inputs of the detectors to individually operate the respective detectors during successive half cycles of the control signal for as long as the associated portions of the control signal exceed the threshold;

first and second normally disabled energizing paths directly coupled to the output of the associated detectors, each energizing path including a separate coil of the instrument and means for rectifying current flowing through the coil; and means for individually enabling the paths during the operating intervals of the associated detectors to cause duration-modulated pulses of DC energizing current to flow through the associated coils, and the resulting average currents through the coils forming the push-pull replicas of the input signal.

2. An amplifier stage as defined in claim 1, in which the generating means and the adding means have a common reference terminal, and in which the generating means comprises, in combination, means for producing a repetitive square wave at the first rate, and a ladder network coupled between the output of the square wave producing means and the input of the adding means, said ladder network comprising first and second resistors in serial relation, a third resistor bridging the first and second resistors, and a capacitor connected between the junction of the first and second resistors and the reference terminal.

3. In a dual-coil electromagnetic instrument a pulse-modulated amplifier stage for applying, to the respective coils, push-pull replicas of a relatively slowly varying input signal which comprises:

means for generating, at a first rate higher than the highest frequency component of the input signal, a cyclically repetitive auxiliary signal exhibiting generally symmetrical positive-going and negative-going triangular portions during successive half cycles thereof;

means for adding the auxiliary signal and the input signal to generate a composite control signal;

first and second transistors having opposite conductivity types and connected in common-emitter configuration;

means for biasing the first and second transistors to cut off at different threshold levels;

means for individually coupling the control signal to the bases of the first and second transistors to trigger the respective transistors into conduction during alternate half cycles of the control signal for as long as the corresponding portion of the control signal exceeds the associated bias;

a first DC energizing path including, in serial relation, a first coil of the instrument and the collector-emitter path of a normally nonconductive third transistor of opposite conductivity type to the first transistor;

means for coupling the collector of the first transistor to the base of the third transistor to operate the first path during the conductive interval of the first transistor to apply energizing current to the first coil;

a second DC energizing path including, in serial relation, a second coil of the instrument and the collector-emitter path of a normally nonconductive fourth transistor of opposite conductivity type to the second transistor;

means for coupling the collector of the second transistor to the base of the fourth transistor to operate the second path during the conductive interval of the second transistor to apply energizing current to the second coil; and a pair of diodes individually shunting the first and second coils and poled to provide a high impedance thereacross during the operated intervals of the associated energizing paths.

4. An amplifier stage as defined in claim 3, further comprising first and second negative feedback paths individually extending between the outputs of the third and fourth transistors and the inputs of the first and second transistors, respectively.

References Cited

UNITED STATES PATENTS 3,064,192   11/1962   Schwarzlander _____ 324—132X

RUDOLPH V. ROLINEC, Primary Examiner

E. F. KARLSEN, Assistant Examiner

U.S. Cl. X.R.

324—132, 140